June 28, 1949.  F. L. FITZPATRICK  2,474,660
MANUFACTURE OF PRESTRESSED CONCRETE
PIPE AND THE LIKE
Filed July 19, 1947
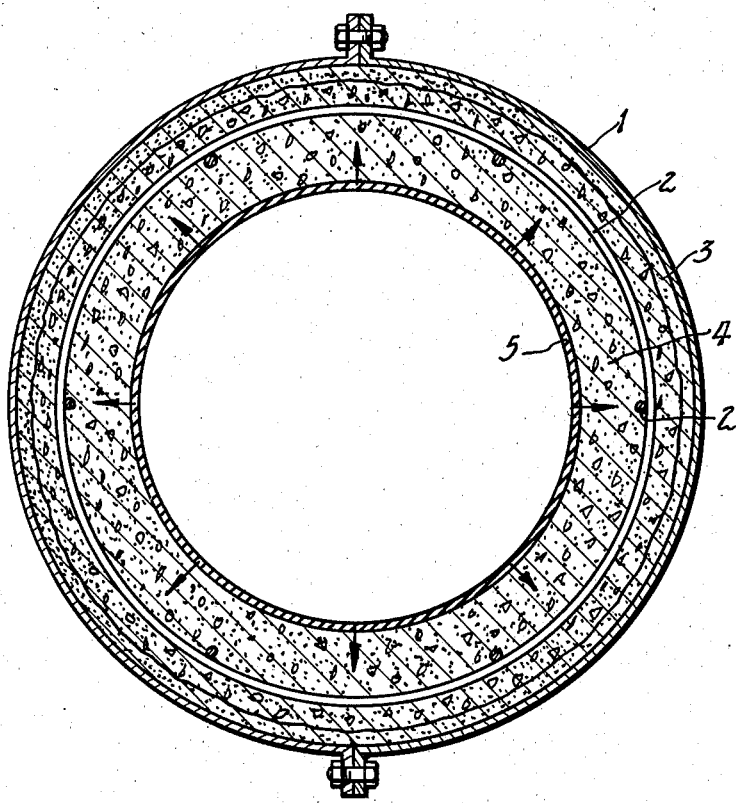
INVENTOR
FRANK LIONEL FITZPATRICK
By Richardson and David
Attys Patented June 28, 1949

2,474,660

UNITED STATES PATENT OFFICE 2,474,660

MANUFACTURE OF PRESTRESSED CONCRETE PIPE AND THE LIKE

Frank Lionel Fitzpatrick, East Malvern, Victoria, Australia, assignor to Rocla Limited, Springvale, Victoria, Australia, a company of Australia Application July 19, 1947, Serial No. 762,216
In Australia August 19, 1946

4 Claims. (Cl. 25—154)

In the manufacture of reinforced concrete pipes by the rotary process I have previously subjected the pipe when it is newly formed and while it remains in the mould, to internal pressure in order to expel surplus water, prestress the metal reinforcement and obtain other advantageous results.

According to my previous procedure, as used or proposed, the required internal pressure has been imparted to the pipe by means of an expansible core of rubber, metal or other suitable material, and sand or other granular or powdered material (hereinafter included in the term "sandy material") has been interposed between the core and the inner surface of the pipe to serve as a pressure transmitting medium.

In order that the metal reinforcement may be pretensioned during this operation, it has heretofore been my normal practice to relax the outer mould slightly before or during the expanding operation, and thereby permit of a slight distension of the pipe and reinforcement therein. However, such relaxing of the outer mould may require a more elaborate and expensive mould construction than would otherwise be necessary, while the resultant movement is not uniform around the circumference of the pipe, and the operation is time absorbing.

The general object of the present invention is to provide improvements in the manufacture of prestressed concrete pipes and like prestressed concrete articles each having a cylindrical or substantially cylindrical inner cavity, while a specific object is to obviate the aforesaid disadvantages of the existing art.

The present invention broadly comprises inserting the reinforcement in a mould, lining the inner surface of the mould with a layer of compressible material which ultimately becomes incorporated in and forms the outer layer of the pipe, forming therein the main body of a reinforced concrete pipe or like reinforced concrete article having a cylindrical or substantially cylindrical inner cavity and subsequently, while said pipe or like article is in the newly formed condition and has not finally set by chemical hardening to any appreciable extent, subjecting it to outwardly directed pressure, so that the said compressible material yields sufficiently to permit of the distension of the main body of the pipe or like article necessary to produce the required pretensioning of the reinforcement.

As the application of the invention to a reinforced pipe does not differ from its application to like reinforced concrete articles having cylindrical or substantially cylindrical inner cavities, a pipe only is referred to in the following description.

The term "compressible material" is used herein to mean a material which will contract sufficiently in volume under the pressure in the process to permit the desired pretensioning of the reinforcement of the pipe.

A subsidiary feature of the invention resides in applying said layer of compressible material to the inner surface of the mould by pouring a fluid cementitious mixture into the mould while the latter is being rotated; that is to say, the said layer is formed by the same procedure as that by which the main body of the pipe is subsequently formed.

The compressible layer may be formed of a cement mixture incorporating a foaming agent and/or fibrous material and/or any other constituents, which will result in the formation on the inner surface of the mould of a layer of material which contains a substantially greater percentage of voids and/or of expressible liquid than the concrete of which the main body of the pipe is to be formed. On account of this higher percentage of voids and/or of expressible liquid this layer on the inner surface of the mould is substantially more compressible than the concrete of which the main body of the pipe is formed. It is necessary for the latter concrete to be compact and to contain a relatively low percentage of voids because otherwise upon the subsequent application of pressure according to this process there would be excessive yielding and change of the inner diameter of the pipe and also this concrete would pass through the reinforcement instead of stretching the latter.

The term "concrete" as used herein comprehends mixtures of Portland or other hydraulic cement with water and any other suitable material such as sand and/or crushed stone.

Other features of the invention are hereinafter described.

One practical specific example of the invention will now be described with reference to the accompanying drawing showing a cross-section through a mould containing a pipe formed with an outer compressible layer and containing an inner core of rubber or other expansible material.

The mould 1 may be any suitable construction of rotary or centrifugal pipe mould. This mould, in which the necessary metal reinforcement 2 has been inserted, is rotated in the usual way, and a relatively fluid cement mixture 3 which will ultimately set to form on the inner surface of the mould a relatively thin compressible layer, is poured thereinto and passes through the reinforcement, and is centrifugally distributed over the inner surface of the mould outside the reinforcement. The layer of material so formed may conveniently be of the order of about one eighth to one quarter of an inch in thickness.

Preferably the said mixture comprises cement, water, a suitable fibrous material (e. g. short fibred asbestos) and a small amount of a foam-generating agent, such as sodium resinate. However, many different materials which will form a layer possessing a suitable measure of compressibility may alternatively be used.

Preferably, after the said mixture has been introduced and distributed the mould should be rotated at a sufficiently high speed to compact the mixture to some extent.

The main body of the pipe is then formed in the usual way by pouring into the rotating mould the required amount of a suitable concrete mixture 4 which is centrifugally distributed on and united to the inner surface of the previously formed outer compressible layer.

After the pipe so formed has set by rotation sufficiently to be self-sustaining, but before chemical hardening due to hydration has proceeded to any appreciable extent, a hollow expansible core 5 is inserted therein, the pipe at this stage being still contained within the outer mould.

Preferably the core is substantially smaller in cross section than the interior of the pipe, in which case the intervening space is filled with sandy material.

The core is then expanded by supplying thereto a fluid under pressure so that pressure is transmitted outwardly approximately in the direction of the arrows through the granular material to the surrounding pipe. The pressure so imparted to the concrete cylinder is sufficiently high to expand it slightly, and this expansion is permitted by the yielding of the outer layer of compressible material which is simultaneously compressed.

The pressure applied to the core may be of the order of 300 pounds per square inch but this depends in every case upon such factors as the diameter of the pipe in question, the amount of circumferential reinforcement and the degree of prestressing required.

In the course of the compression air and/or liquid are expelled and will escape through mould openings, or perforations can be provided in the mould for that purpose. Where the outer layer includes expressible water this may pass through the main body of concrete into the layer of sandy material.

Consequently, by this invention the desired prestressing of the reinforcement of the concrete is effected in a simple and expeditious manner without the necessity for relaxing the outer mould or of using moulds of special construction, and substantial economies are obtained while the desired even degree of expansion around the full circumference is achieved.

I claim:

1. The manufacture of a prestressed reinforced concrete pipe, or like prestressed reinforced concrete article having a cylindrical or substantially cylindrical inner cavity, comprising inserting the reinforcement in a mould, lining the inner surface of the mould with a layer of compressible material (which ultimately becomes incorporated in and forms the outer layer of the pipe or like article), forming therein by the rotary process the main body of a reinforced concrete pipe, or like reinforced concrete article having a cylindrical or substantially cylindrical inner cavity, and subsequently subjecting the said pipe or like article to outwardly directed pressure, so that the said compressible material yields sufficiently to permit of the distension of the main body of the said pipe or like article.

2. The manufacture of a prestressed reinforced concrete pipe, or like prestressed reinforced concrete article, having a cylindrical or substantially cylindrical inner cavity, as claimed in claim 1, in which the inner surface of the mould is lined with the layer of compressible material by pouring a fluid cementitious mixture into the mould while the latter is being rotated.

3. The manufacture of a prestressed reinforced concrete pipe, or like prestressed reinforced concrete article having a cylindrical or substantially cylindrical inner cavity, as claimed in claim 1, in which the compressible material is a cement mixture incorporating a foaming agent.

4. The manufacture of a prestressed reinforced concrete pipe, or like prestressed reinforced concrete article having a cylindrical or substantially cylindrical inner cavity, as claimed in claim 1, in which the compressible material is a cement mixture incorporating fibrous material.

FRANK LIONEL FITZPATRICK.

REFERENCES CITED

The following references are of record in the file of this patent:

UNITED STATES PATENTS

| Number | Name | Date |
|---|---|---|
| 1,965,748 | Mitchell | July 10, 1934 |
| 2,048,253 | Freyssinet | July 21, 1936 |